United States Patent Office 3,840,627
Patented Oct. 8, 1974

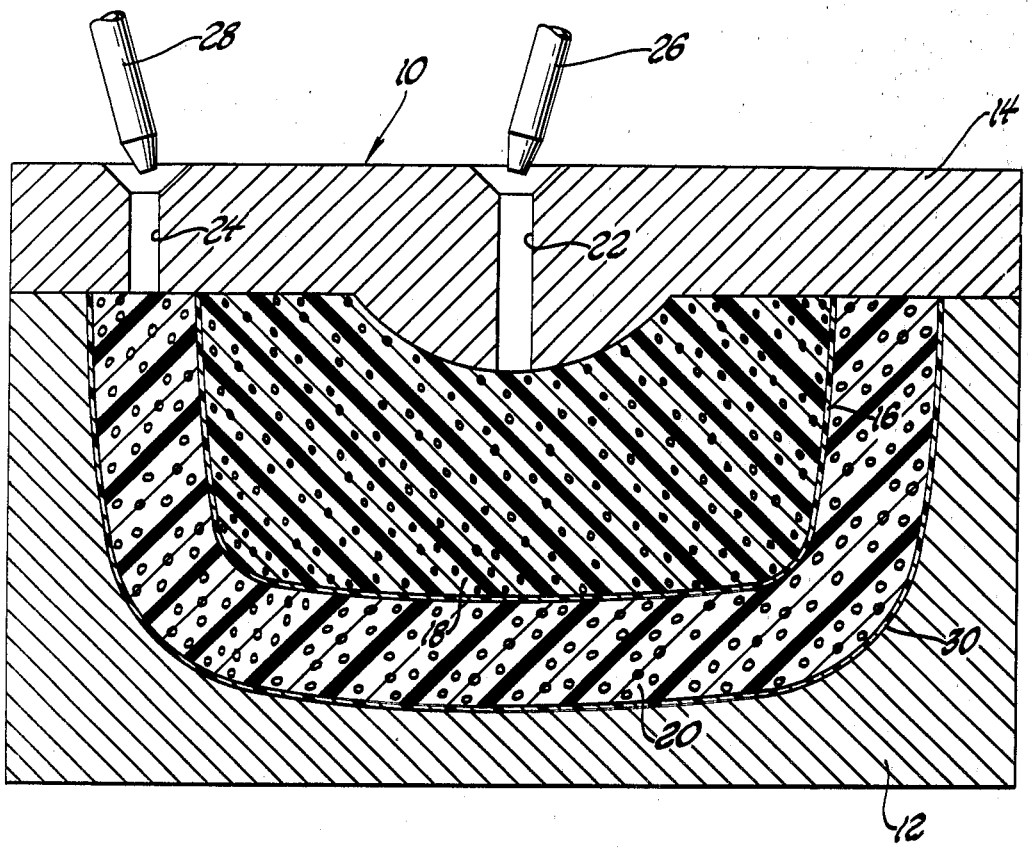

3,840,627
ONE-STEP METHOD OF MOLDING A DUAL FOAM CRASH PAD
Richard D. Rhodes, Jr., Somersworth, N.H., assignor to McCord Corporation, Detroit, Mich.
Filed Apr. 17, 1972, Ser. No. 244,502
Int. Cl. B29d 27/00
U.S. Cl. 264—46
4 Claims

ABSTRACT OF THE DISCLOSURE

The instant invention relates to a mold and a method used therewith for manufacturing multi-density foamed articles such as dual foam crash pads of the type used in automobiles in a one step operation which includes providing divider means disposed in a mold cavity for dividing the mold cavity into at least two sections whereby a first foamable material may be injected into a first section while substantially simultaneously injecting a second foamable material into a second section.

---

In recent years multi-density foamed articles have become widely used. Energy absorbing devices for example, such as foam crash pads for the protection of automobile passengers have been developed which include an outer shell portion and an inner core portion wherein the core portion is made of a more rigid i.e., firmer or stiffer, material than the outer shell portion. This dual foam structure affords better protection from injury because the soft outer shell softens the blow while the inner core is sufficiently resilient to absorb substantial energy.

Heretofore the manufacture of multi-density foamed articles required a plurality of steps, that is the outer shell was formed with a cavity disposed therein to receive a prefoamed inner core which was inserted into the cavity of the shell or an inner core was foamed within the cavity. Other methods are available, of course, but in all cases a series of operations or steps are required to form a multi-density article, thereby increasing the cost and inefficiency of the manufacturing operation.

It is therefore an object and feature of the instant invention to provide a mold assembly of the type used to manufacture multi-density foamed articles comprising divider means disposed within a mold cavity for dividing the mold cavity into at least two sections and passage means in communication with each of the sections whereby foamable materials may be injected substantially simultaneously into each of said sections.

It is another object and feature of the instant invention to provide a method for manufacturing a multi-density foamed article in substantially a one step operation, that is, once the mold has been prepared and closed the foamable materials are substantially simultaneously injected and a multi-density article results.

In correlation with the foregoing object and feature, it is another object and feature of the instant invention to provide a method for manufacturing multi-density foamed article which comprises the steps of injecting a first foamable material into a first section divided from a second section by divider means while substantially simultaneously injecting a second foamable material into a second section and foaming and curing the first and second foamable materials whereby the first section is adapted to be comprised of a foamed material of substantially, different physical characteristics than the second section.

Other objects and attendant advantages of the instant invention will be readily appreciated as the same becomes better understood by reference to the following detailed description when considered in connection with the accompanying drawings wherein:

The figure is a cross-sectional view of a multi-density foam crash pad manufactured in accordance with the method of the instant invention.

Referring to the drawing, a mold assembly is generally indicated at 10. A mold cavity is defined by a female body member 12 and a cover member 14. The mold assembly is understood to include any standard clamping means (not shown) for holding and sealing the cover member 14 to the body member 12.

Within the mold cavity and temporarily secured to the cover member 14 is a divider means 16. The divider means 16 separates the mold cavity into two sections, an inner or core section 18 and an outer or shell section 20.

The divider means 16 can be made of a variety of thin materials such as paper, cardboard, or polystyrene which will define the desired shape of the core section 18. Preferably the divider means 16 is a flexible membrane, although it may be rigid.

The mold cover 14 includes pour hole or passage 22 which is in communcation with the inner or core section 18 and a pour hole or passage 24 which is in communication with the outer or shell section 20.

When the mold cover 14 is clamped in place with the divider means 16 held thereto within the mold cavity to define the core and shell sections 18 and 20, the mold assembly 10 is ready to receive a foamed material. A first foamable material is injected from injection nozzle 26 into the core section 18 through pour hole 22 and a second foamable material is injected from injection nozzle 28 into the shell section 20 through pour hole 24.

The outer or shell section 20 may be foamed from anyone of a number of foamable materials or resins which are self-skinning to produce a skin or decorative cover 30 around the external surface of the multi-density foam crash pad; however, this is not required for the satisfactory performance of the crash pad. Alternatively, a sheet of plastic type material may be disposed against the wall of the shell section 20 of the cavity before injecting the foamable material to provide the skin or decorative cover.

The physical properties of the two foamable materials are different so that when the materials have foamed and cured in the usual manner the density of the core section 18 will be different from that of the shell section 20. In the case of crash pads for automobiles the foamable materials are selected and injected so that the core section 18 will be more dense or firmer than the shell section 20. In other words, the shell section 20 will be softer and more resilient than the core section 18.

The injection operation is timed so that as the foamable materials foam and fill the two sections of the mold cavity the divider means 16 will not be distorted but will maintain its original desired shape. The timing of the two shots of foamable material would depend on the reactivity of each material used and would yield a multi-density foam crash pad with the core section 18 having the same dimensions as defined by the divider means 16. In other words, the foamable materials expand at a rate which causes no significant distortion or change in the position of the divider means 16.

The foamable materials having been foamed are allowed to cure as is the normal practice. The multi-density foam crash pad is then removed from the mold cavity; the divider means 16 remain an integral part thereof. It is to be understood that the divider means 16 may be selected for its contributory physical properties; that is, the thickness, composition, or design may be varied to allow it to contribute to the energy absorbing characteristics of the crash pad.

The method is not restricted to dual foam crash pads or articles because it is obvious that additional divider means and pour holes may be provided so that three or four layers of foamed material may be produced.

By the method and provisions thereof set forth in the preceding description, a method for manufacturing a multi-density foam article and in particular a multi-density foam crash pad has been disclosed.

While a novel method and mold assembly for manufacturing a specific form of a multi-density foamed article have been illustrated and described in the foregoing specification and accompanying drawings, it should be understood that the invention is not limited to the exact method and assembly shown but that various alternatives in the construction and arrangement of parts as well as the steps of the method will become apparent to those skilled in the art without departing from the scope and spirit of the invention which is defined by the claims which follow.

The embodiments of the invention in which an exclusive property or privilege is claimed are defined as follows:

1. A method for manufacturing a multi-density foamed article which comprises the steps of injecting into an enclosed mold cavity a first foamable material into a first section of said mold cavity divided from a second section by a divider means which will not be distorted while substantially simultaneously injecting a second foamable material into the second section while maintaining said first and second foamable materials separated by said divider means, and foaming and curing said first and second foamable materials with said divider means in place, said first and second foamable materials upon curing yielding foamed products differing substantially in physical characteristics.

2. The method as set forth in claim 1 further defined as disposing a sheet of material against the wall of said cavity before injecting the foamable materials.

3. A method for manufacturing a multi-density foamed article which comprises the steps of injecting a first foamable material into a core section divided from a shell section by a flexible and divider means which will not be distorted while substantially simultaneously injecting a second foamable material into the shell section while maintaining said first and second foamable materials separated by said divider means, foaming and curing said first and second foamable materials with said divider means in place, said first and second foamable materials upon curing yielding foamed products differing substantially in physical characteristics.

4. The method as set forth in claim 3 further defined as disposing a sheet of material against the wall of said shell section before injecting the foamable material.

References Cited
UNITED STATES PATENTS

| | | | |
|---|---|---|---|
| 3,088,539 | 5/1963 | Mathues | 180—90 |
| 2,341,732 | 2/1944 | Marvin | 264—47 X |
| 2,586,275 | 2/1952 | Toulmin | 264—47 X |
| 3,161,436 | 12/1964 | Hood | 297—460 |
| 3,264,382 | 8/1966 | Angell et al. | 264—46 |
| 3,320,339 | 5/1967 | Smith | 264—46 |
| 3,348,597 | 10/1967 | Goldberg et al. | 264—46 X |
| 3,393,259 | 7/1968 | Trogdon | 264—46 |
| 3,423,490 | 1/1969 | Trogdon et al. | 264—46 |

H. S. COCKERAM, Primary Examiner

U.S. Cl. X.R.

180—90; 249—83; 264—45